UNITED STATES PATENT OFFICE.

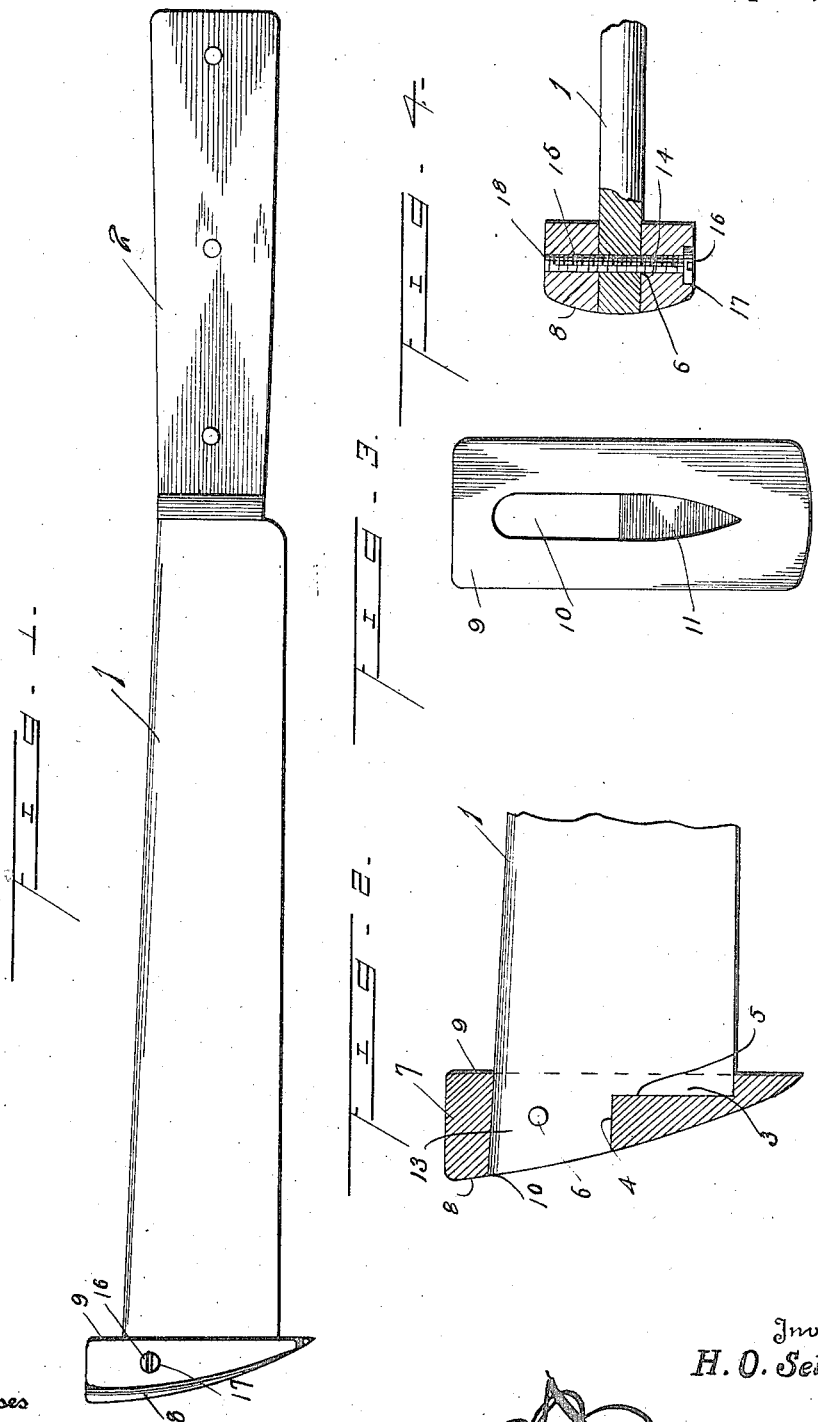

HARRY O. SEBRING, OF DEER WOOD, MINNESOTA.

KNIFE-GUARD.

1,239,626.      Specification of Letters Patent.      Patented Sept. 11, 1917.

Application filed December 20, 1916. Serial No. 137,982.

*To all whom it may concern:*

Be it known that I, HARRY O. SEBRING, a citizen of the United States, residing at Deer Wood, in the county of Crow Wing and State of Minnesota, have invented certain new and useful Improvements in Knife-Guards; and I do hereby declare the following to be a full clear, and exact description of the invention, such as will enable others skilled in the art to which it appertains to make and use the same.

The object of this invention is the provision of a guard for the end of a butcher's knife or other knife used in slaughter houses, by butchers and the like when cutting up hogs, steers and the like.

A still further object of this invention is the provision of a guard which is adapted to be secured to the end of a butcher's knife so that a butcher may easily and quickly extract portions from the interior of an animal without fear of puncturing, cutting or otherwise injuring the intestines of the animal.

A still further object of this invention is the provision of a guard or shield at the end of a butcher's knife of various sizes, and one that may be easily and quickly secured to and removed from the butcher's knife, and one that when in use will eliminate the use of the hand of the operator from holding the intestines back when cutting on the interior of an animal.

A still further object of this invention is the provision of a knife guard of this character which will be simple, practical, and comparatively inexpensive in construction, and one that can be manufactured and sold at a low cost.

With these and other objects in view the invention consists in the novel combination and arrangement of parts hereinafter more fully described and set forth in the claims hereto appended.

In the drawings:

Figure 1 is a side elevation of a knife with my guard attached thereto and made in accordance with this invention.

Fig. 2 is a vertical sectional view taken through the guard and illustrating a fragmentary portion of a knife.

Fig. 3 is a rear elevation of a guard detached from a knife.

Fig. 4 is a horizontal sectional view illustrating the manner in which the guard is secured to the end of a knife blade showing the knife blade partly broken away.

Like numerals of reference designate corresponding parts in all the figures of the drawing.

Referring more particularly to the drawings the numeral 1 designates the blade of an ordinary butcher knife such as used by butchers in slaughter houses for the cutting up of various kinds of animals. The blade 1 is provided at one end with the usual handle 2 and has its forward end cut away at the lower portion as at 3 to provide a horizontal wall 4 and a vertical wall 5, the extended portion of the forward end of the knife blade is provided with an opening 6 the purpose of which will be hereinafter more fully described.

My improved guard or shield member 7 is adapted to be secured to the forward end of the knife blade 1, and comprises an elongated tapered body which has a rounded beveled outer face 8 and a straight inner face 9. The body is provided adjacent its upper enlarged end with an elongated opening 10 through which is adapted to extend the outwardly extending portions at the front end of the knife blade 1. The body of the shield member 7 is provided with a recess 11 adjacent the lower end thereof and its upper end communicates with the opening 10 and is adapted to receive the straight vertical wall 5 of the forward end of the knife blade 1 positioned therein.

The guard 7 has its front face beveled as at 8 to provide a rounded surface which will prevent injury to the intestines of an animal during the butchering operation. The forward extending portion 13 of the knife blade 1 is provided with an opening 6 and the portion is adapted to extend through the slot 10 adjacent the upper enlarged end of the member 7. The reduced portion constituting the vertical wall is adapted to rest in the recesses 7 thus limiting the movement of the guard on the forward end of the knife blade and at the same time having a wedging action thereon. The guard member 7 is provided with a transversely extending opening 14 which is adapted to aline with the opening 6 in the extension in the blade 1. The screw 15 is arranged transversely through the screw threaded opening 6 thus detachably securing the guard member 7 to the forward end of the blade 1. The head 16 of the screw 15 is counter-sunk in the side face of the guard 7 as at 17 and its opposite end is flush with the other side face as at 18 thus it can be seen that the sides of the guard member 7 are smooth throughout their entire surfaces, thus obviating the pulling or injuring of the intestines of an animal being butchered.

The manner of constructing the device is as follows:

The butcher knife has its usual pointed end extended and the extended portion is provided with an opening, the extended portion is then extended through the slot in the guard adjacent the upper enlarged end thereof and the portion of the knife blade below the extension is fitted in the recess in the guard and thus the guard is frictionally secured to the end of the knife blade at the same time alining its openings with the opening in the extended portion of the knife blade, the screw is then arranged transversely through the openings in the guard member and knife blade, thus rigidly and reliably securing the guard member to the knife blade, and the device is ready for use.

What is claimed is:

1. A knife of the class described comprising a blade, a handle at one end of the blade, an extension formed on and extending outwardly from the opposite end of the blade adjacent the upper end thereof, said extension provided with a transverse opening, a guard, said guard comprising a tapered body, having a rounded front face, and straight rear face, said body provided adjacent the upper enlarged end with a vertical slot, said guard also having a recess on its rear face adjacent its lower end and the upper end of the recess communicating with the slot, said extension of the blade adapted to extend through the slot and the portion of the blade resting in the recess, means extending transversely through the guard and blade for detachably securing the guard in position upon the end of the blade.

2. A knife of the class described including a blade, a handle at one end of the blade, the opposite end of the blade extending outwardly from the upper longitudinal edge thereof, a guard, said guard comprising a tapered body portion having a rounded beveled front face and a straight rear face, said body of the guard provided adjacent its upper enlarged end with a vertical slot and having a recess in its rear face adjacent its lower end and communicating with the lower wall of the vertical slot, said body also provided at diametrically opposite points in its side face with alined openings, said guard adapted to be secured on the end of a knife blade and a screw arranged transversely through the openings in the body and blade for removably securing the guard to the knife blade as and for the purpose specified.

In testimony whereof I affix my signature in presence of two witnesses.

HARRY O. SEBRING.

Witnesses:
H. J. ERNSTER,
WM. D. K. EIMERS.

Copies of this patent may be obtained for five cents each, by addressing the "Commissioner of Patents, Washington, D. C."